United States Patent
Schori

(10) Patent No.: US 11,541,852 B2
(45) Date of Patent: Jan. 3, 2023

(54) METHOD FOR OPERATING AN ACCELERATOR PEDAL-CONTROLLED DISTANCE CONTROLLER OF A VEHICLE AND CONTROL UNIT

(71) Applicant: Robert Bosch GmbH, Stuttgart (DE)

(72) Inventor: Thorsten Schori, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 218 days.

(21) Appl. No.: 17/080,559

(22) Filed: Oct. 26, 2020

(65) Prior Publication Data
US 2021/0146893 A1 May 20, 2021

(30) Foreign Application Priority Data

Nov. 14, 2019 (DE) .......................... 102019217563.5
Mar. 30, 2020 (DE) .......................... 102020204081.8

(51) Int. Cl.
*B60T 7/22* (2006.01)
*B60T 8/17* (2006.01)
*B60T 8/32* (2006.01)
*B60W 10/10* (2012.01)
*B60W 10/18* (2012.01)
(Continued)

(52) U.S. Cl.
CPC *B60T 7/22* (2013.01); *B60T 8/17* (2013.01); *B60T 8/32* (2013.01); *B60W 10/10* (2013.01); *B60W 10/18* (2013.01); *B60W 30/09* (2013.01); *B60W 30/16* (2013.01); *B60T 2201/022* (2013.01); *B60T 2210/32* (2013.01); *B60T 2220/04* (2013.01); *B60T 2220/06* (2013.01); *B60W 2540/10* (2013.01); *B60W 2540/106* (2013.01); *B60W 2540/12* (2013.01); *B60W 2554/402* (2020.02); *B60W 2710/10* (2013.01);
(Continued)

(58) Field of Classification Search
CPC ....... B60W 2540/10; B60W 2540/106; B60W 2540/12; B60W 10/06; B60W 10/10; B60W 10/18; B60W 10/188; B60W 2710/10; B60W 2710/18; B60W 2754/30; B60W 30/09; B60W 30/16; B60W 2554/402; B60T 2201/022; B60T 2220/04; B60T 2220/06; B60T 7/22; B60T 8/17; B60T 8/32; B60T 2210/32
USPC .......................................................... 701/96
See application file for complete search history.

(56) References Cited

U.S. PATENT DOCUMENTS

2002/0069009 A1* 6/2002 Hellmann .......... B60K 31/0008
701/55
2007/0255481 A1* 11/2007 Egawa .................. B60W 30/16
701/96
(Continued)

FOREIGN PATENT DOCUMENTS

DE 102017210100 B4 * 6/2019 ............. B60T 13/74
DE 102019104709 A1 * 8/2019 .......... F02N 11/0814
(Continued)

*Primary Examiner* — Atul Trivedi
(74) *Attorney, Agent, or Firm* — Norton Rose Fulbright US LLP; Gerard Messina

(57) ABSTRACT

A method for operating an accelerator pedal-controlled distance controller of a vehicle. The distance controller regulates a distance to a target vehicle as a function of an actuator pedal value of the vehicle and activates automatic braking operations as necessary. A braking operation is aborted when the accelerator pedal value is increased during the braking operation.

10 Claims, 2 Drawing Sheets

(51) Int. Cl.
  *B60W 30/09* (2012.01)
  *B60W 30/16* (2020.01)
(52) U.S. Cl.
  CPC ..... *B60W 2710/18* (2013.01); *B60W 2754/30* (2020.02)

(56) References Cited

U.S. PATENT DOCUMENTS

| | | | |
|---|---|---|---|
| 2011/0004387 A1* | 1/2011 | Sugano | B60W 50/16 |
| | | | 701/96 |
| 2014/0207352 A1* | 7/2014 | Rossi | B60K 28/14 |
| | | | 701/70 |
| 2016/0107655 A1* | 4/2016 | Desnoyer | B60W 50/082 |
| | | | 701/23 |
| 2018/0099580 A1* | 4/2018 | Kumazaki | B60W 20/30 |
| 2018/0281791 A1* | 10/2018 | Fukaya | B60W 30/0956 |
| 2019/0176794 A1* | 6/2019 | Pinto, IV | B60T 17/22 |
| 2019/0227546 A1* | 7/2019 | Sato | B60W 30/18163 |
| 2019/0291734 A1* | 9/2019 | Mizuno | B60L 7/26 |
| 2020/0001864 A1* | 1/2020 | Oyama | B60W 10/18 |
| 2020/0207348 A1* | 7/2020 | Sato | B60W 10/18 |
| 2020/0255011 A1* | 8/2020 | Sato | B60W 30/14 |
| 2020/0269839 A1* | 8/2020 | Sato | B60W 40/04 |
| 2020/0282975 A1* | 9/2020 | Minase | B62D 15/0285 |
| 2020/0298727 A1* | 9/2020 | Ukai | B60W 60/0051 |
| 2020/0307582 A1* | 10/2020 | Sato | B60W 10/04 |
| 2021/0046946 A1* | 2/2021 | Nemec | G05D 1/0061 |

FOREIGN PATENT DOCUMENTS

| | | | | |
|---|---|---|---|---|
| DE | 102019134405 A1 | * | 6/2020 | ............ F02D 29/02 |
| EP | 1743818 A1 | * | 1/2007 | ............... B60T 7/22 |
| GB | 2546149 A | * | 7/2017 | ............. B60T 7/042 |
| WO | WO-2020230467 A1 | * | 11/2020 | ............ B60W 30/12 |

* cited by examiner

METHOD FOR OPERATING AN ACCELERATOR PEDAL-CONTROLLED DISTANCE CONTROLLER OF A VEHICLE AND CONTROL UNIT

CROSS REFERENCE

The present application claims the benefit under 35 U.S.C. § 119 of German Patent Application No. DE 102019217563.5 filed on Nov. 14, 2019, and German Patent Application No. DE 102020204081.8 filed on Mar. 30, 2020, which are both expressly incorporated herein by reference in their entireties.

FIELD

The present invention relates to a method for operating an accelerator pedal-controlled distance controller of a vehicle and a driver assistance system including such a distance controller and implemented in a control unit.

BACKGROUND INFORMATION

In the case of a vehicle including a distance controller, a situation-dependent setpoint distance to a preceding vehicle is set. During the approach to the preceding vehicle, the distance controller reduces an engine output of the vehicle with respect to a driver input of a driver of the vehicle tapped at an accelerator pedal of the vehicle until the vehicle travels behind the preceding vehicle, at the setpoint distance, at a speed of the preceding vehicle. The distance controller may be deactivated, for example, with the aid of a kickdown of the accelerator pedal, for example, in order to pass the preceding vehicle.

SUMMARY

The present invention provides a method for operating an accelerator pedal-controlled distance controller of a vehicle, an appropriate control unit, and an appropriate computer program product and a machine-readable memory medium. Advantageous refinements and improvements of the present invention result from the description here and the figures.

Specific embodiments of the present invention may make it possible, in an advantageous way, to abort a braking operation behind a target vehicle erroneously detected as a relevant preceding vehicle, in order to subsequently travel past the target vehicle.

Within the scope of the present invention, which is described herein, the input of a driver command is mentioned, in particular for requesting an acceleration, or an accelerator pedal-controlled distance controller. In the case of two-track vehicles, such a unit for inputting a driver command may be an accelerator pedal, which is actuated with the aid of the driver's foot. Alternatively, modifications of this input unit are also possible, which achieve the same objective as the accelerator pedal. These are, for example, units for hand throttle actuation, of the type offered by most vehicle manufacturers as special accessories, or hand throttle levers or speed twist grips, of the type utilized for single-track vehicles, such as motor scooters, or motorcycles, or for motorized three-wheelers (trikes) or quads. Such alternatives would be understood by those skilled in the art obviously, based on the present disclosure, without exercising inventive skill. In addition, the term "accelerator pedal" or "accelerator pedal-controlled distance controller" is utilized within the scope of the present application for reasons of better clarity and easier readability, although all further alternatives understood by those skilled in the art (based on the present disclosure), such as distance controllers, which are controlled with the aid of hand throttle grips or hand throttle levers or speed twist grips, are therefore also included.

A method is provided for operating an accelerator pedal-controlled distance controller of a vehicle, the distance controller regulating a distance to a target vehicle depending on an accelerator pedal value of an accelerator pedal of the vehicle and activating automatic braking operations as necessary, a braking operation being aborted when the accelerator pedal value is increased during the braking operation.

Specific embodiments of the present invention may be considered, among other things, as being based on the ideas and findings described in the following.

In the case of a distance controller of a driver assistance system of a vehicle, a measured distance to a preceding target vehicle may be compared to a setpoint distance value, and a setpoint power value for a drive train of the vehicle may be increased when the distance is greater than the setpoint distance value. Conversely, the setpoint drive value may be reduced when the distance is less than the setpoint distance value. When the setpoint drive value is approximately zero and the distance is less than the setpoint distance value, the distance controller may activate a braking system of the vehicle with the aid of a setpoint braking torque value, in order to initiate a braking operation.

The distance is detected by a sensor system of the vehicle. The distance may be detected by one or multiple sensors of the sensor system. The sensor system may encompass, for example, at least one radar sensor, a LIDAR sensor, and/or a camera.

In the case of a conventional distance controller, the setpoint distance value is speed-dependent and may be preselected by a driver of the vehicle, for example, with the aid of an operating element, depending on how close the vehicle is to get to the target vehicle. The speed-dependent setpoint distance value may be defined as a time slot, since a distance covered within a time period of the time slot increases as speed increases, and vice versa.

In the case of an accelerator pedal-controlled distance controller, the setpoint distance value is also speed-dependent and, moreover, is affected by an accelerator pedal value tapped at an accelerator pedal of the vehicle. The accelerator pedal value correlates with an angle of the accelerator pedal. The accelerator pedal value may be, for example, a percentage value of the angle. The setpoint distance value becomes that much lower, the more forcefully a driver of the vehicle depresses the accelerator pedal, i.e., the accelerator pedal value increases. The setpoint distance value does not become less than a speed-dependent safety value.

When the target vehicle ahead of the vehicle brakes, the distance quickly decreases and, consequently, the setpoint power value also quickly drops to essentially zero. Thereafter, the braking system is also activated, since the reduction of the setpoint power value does not suffice to bring the distance approximately into conformance with the setpoint distance value.

When the target vehicle makes a lane change onto the deceleration lane, for example, at an expressway exit, and, in the process, clears the right lane of the expressway for the vehicle, the target vehicle may continue to be detected with the aid of the sensor system. The vehicle, which is still detected, may continue to be erroneously interpreted as the target vehicle for the distance controller. This state may be referred to as adjacent lane interference. The lane change onto the deceleration lane may therefore be erroneously interpreted as the target vehicle negotiating a curve on the same lane. When the detected vehicle now brakes on the deceleration lane, the distance controller will also initiate a braking operation.

The driver of the vehicle recognizes the right lane, which is now clear, however, and wants to accelerate. For this purpose, the driver will further depress his/her accelerator pedal and increase the accelerator pedal value, in order to override the braking operation. In the approach presented here, this increase of the accelerator pedal value is registered and the braking operation is aborted.

In particular, due to the approach presented here, an increase of the accelerator pedal value having a slight gradient is also detected. As a result, no forceful override and no kickdown are necessary in order to abort the braking operation. A possibly unintended excessive acceleration may be avoided in this way.

In general, due to the approach presented here, adjacent lane interferences may be easily resolved. The approach presented here functions regardless of right-hand traffic or left-hand traffic. As a further exemplary application, a passing maneuver may be accelerated due to the abort of the braking operation during a lane change of the target vehicle from the lane of the vehicle onto an adjacent lane. Likewise, with the aid of the approach presented here, a vehicle detected on an adjacent lane while negotiating a curve may be ignored and the negotiation of the curve may be continued approximately without interruption.

The braking operation may be aborted when the accelerator pedal value is increased by a speed-dependent amount. The amount may be proportional to a speed of the vehicle. Due to a dependence of an abort criterion on the speed, the braking operation may be more easily aborted at low speeds than at high speeds.

Moreover, the braking operation may be aborted when the accelerator pedal value is subsequently increased, during the braking operation, to an initial reduction of the accelerator pedal value. The target vehicle may already brake when it is still traveling at least partially on the lane of the vehicle. The driver may respond thereto and instinctively reduce the accelerator pedal value. When the driver recognizes that there is sufficient space to pass the target vehicle, he/she may increase the accelerator pedal value again.

A setpoint braking torque value of the braking system may be reduced during the abort of the braking operation by utilizing a reduction profile. The setpoint braking torque value may be continuously reduced by utilizing the reduction profile, in order to avoid jolts. The reduction profile may be, for example, a ramp or curve. With the aid of the reduction profile, a driving behavior of the vehicle during the abort of the braking operation may be well controllable.

The accelerator pedal value before the braking operation may be stored as a reference value. The braking operation may be aborted when the accelerator pedal value is increased above the reference value. Alternatively, the braking operation may be aborted when the accelerator pedal value is increased by more than a certain amount above the reference value.

Moreover, the braking operation may be aborted when the target vehicle is detected on an adjacent lane. When the erroneously interpreted situation, i.e., the adjacent lane interference, is detected by the driver assistance system, the normal driving operation may be quickly restored.

A value of a setpoint power value for a drive train of the vehicle may be recorded before the braking operation. The setpoint power value may be increased to the recorded value after the abort of the braking operation. The value may also be recorded before an automatic setpoint value reduction preceding the braking operation. In this way, smooth travel may be achieved. An excessive acceleration may be avoided.

The example method in accordance with the present invention may be implemented, for example, in software or hardware or in a mixed form of software and hardware, for example, in a control unit.

Moreover, the present invention described herein provides a driver assistance system, which is designed for carrying out, activating, or implementing the steps of a variant of the example method described herein in appropriate units.

The driver assistance system may be an electrical device encompassing at least one processing unit for processing signals or data, at least one memory unit for storing signals or data, and at least one interface and/or a communication interface for reading in or outputting data, which are embedded into a communication protocol. The processing unit may be, for example, a signal processor, a so-called system ASIC, or a microcontroller for processing sensor signals and outputting data signals depending on the sensor signals. The memory unit may be, for example, a flash memory, an EPROM, or a magnetic memory unit. The interface may be designed as a sensor interface for reading in the sensor signals from a sensor and/or as an actuator interface for outputting the data signals and/or control signals to an actuator. The communication interface may be designed for reading in or outputting the data in a wireless and/or hard-wired manner. The interfaces may also be software modules, which are present, for example, on a microcontroller alongside other software modules.

In addition, a computer program product or a computer program having program code is advantageous, which may be stored on a machine-readable carrier or memory medium such as a semiconductor memory, a hard drive memory or an optical memory, and which may be used for carrying out, implementing, and/or controlling the steps of the method according to one of the above-described specific embodiments, in particular when the program product or program is carried out on a computer or a device.

It is pointed out that some of the possible features and advantages of the present invention are described herein with reference to different specific embodiments. Those skilled in the art recognize that the features of the driver assistance system and of the method may be combined, adapted, or replaced in a suitable way in order to arrive at further specific embodiments of the present invention.

BRIEF DESCRIPTION OF THE DRAWINGS

Specific embodiments of the present invention are described in below with reference to the figures, where neither the figures nor the description herein are to be considered as limiting the present invention.

The figures are merely schematic and are not true to scale. Identical reference numerals in the figures designate identical or identically acting features.

DETAILED DESCRIPTION OF EXAMPLE EMBODIMENTS

Figure 1:
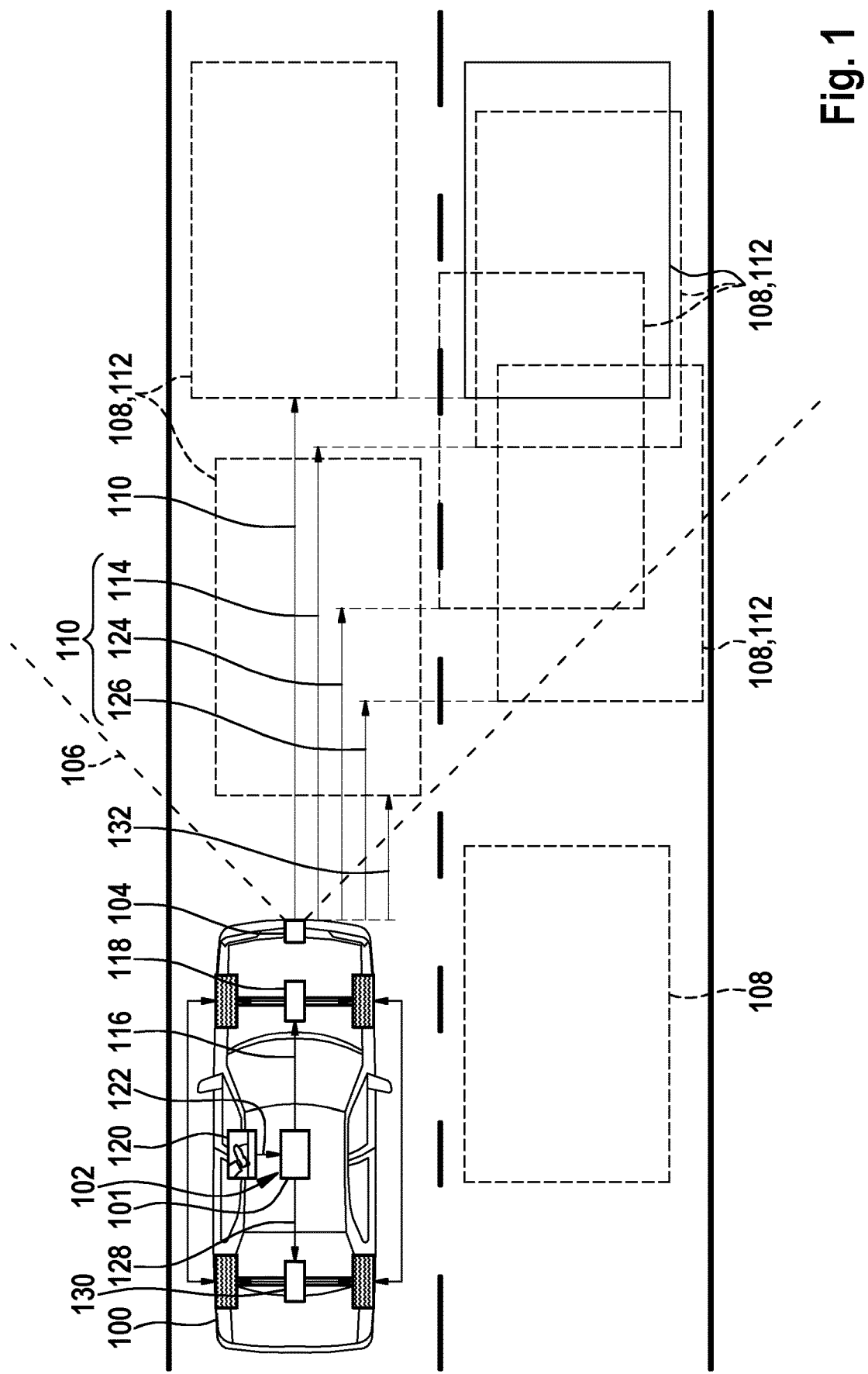
FIG. 1 shows a representation of a vehicle including a driver assistance system according to one exemplary embodiment of the present invention.

FIG. 1 shows a representation of a vehicle 100 including a driver assistance system 102 according to one exemplary embodiment of the present invention, implemented in a control unit 101. Vehicle 100 encompasses a sensor system 104 connected to control unit 101. Sensor system 104 detects at least one detection range 106 situated ahead of vehicle 100 in the travel direction with the aid of at least one sensor.

Vehicle 100 travels on the left lane of a two-lane road, such as an urban beltway or an arterial road. Another vehicle 108 travels ahead of vehicle 100 on a right lane of the road. Other vehicle 108 is at least partially located within detection range 106 and is detected by sensor system 104. Other vehicle 108 travels at a slower speed than vehicle 100. Vehicle 100 approaches other vehicle 108 from behind and a distance 110 between vehicles 100, 108 decreases.

Driver assistance system 102 erroneously classifies other vehicle 108 as target vehicle 112 for a distance controller of driver assistance system 102. This state may be referred to as adjacent lane interference. Due to the adjacent lane interference, the distance controller engages with a drive controller of vehicle 100 before a setpoint distance 114 has been reached and reduces a setpoint power value 116 for a drive train 118 of vehicle 100 until vehicle 100 travels behind target vehicle 112, at setpoint distance 114, at a speed of target vehicle 112, although the lane ahead of vehicle 100 is unoccupied.

The distance controller is an accelerator pedal-controlled distance controller. In the process, a driver of vehicle 100 leaves his/her right foot on an accelerator pedal 120 of the vehicle while the distance controller regulates distance 110. The driver notices the reduction of setpoint power value 116 and instinctively increases an accelerator pedal value 122 at accelerator pedal 120. Due to the increase of accelerator pedal value 122, the distance controller reduces setpoint distance 114, depending on the increase, up to a reduced setpoint distance 124 and adjusts distance 110 accordingly. Vehicle 100 moves closer to target vehicle 112. Reduced setpoint distance 124 may not be arbitrarily lowered. A speed-dependent minimum distance 126 is maintained by the distance controller.

When distance 110 changes quickly, for example, because target vehicle 112 reduces its speed and/or brakes in order to turn, it may be insufficient to reduce setpoint power value 116, and the distance controller engages with a brake controller of vehicle 100, in order to activate a braking operation of vehicle 100. For this purpose, control unit 101 may output, for example, a setpoint braking torque value 128 for a braking system 130 of vehicle 100.

Since the lane ahead of vehicle 100 is clear, the driver increases accelerator pedal value 122 when the braking operation begins. The driver therefore attempts to compensate for the effect of the braking operation by increasing accelerator pedal value 122. The driver does not completely depress accelerator pedal 120 all at once, however, in order to override the distance controller with the aid of a kickdown. The driver presses onto accelerator pedal 120 at a slow speed, i.e., rather gently.

In the example embodiment of the present invention described herein, the braking operation is aborted when the accelerator pedal value 122 is increased during the braking operation. Now vehicle 100 may drive past erroneously detected target vehicle 112. Due to the passing, other vehicle 108 disappears from detection range 106 and, therefore, may no longer be classified as a target vehicle.

In one exemplary embodiment of the present invention, the braking operation is aborted in a controlled manner. In the process, the applied braking torque is not abruptly dispensed with. Rather, the braking torque is reduced by utilizing a reduction profile. The reduction profile may be, for example, a ramp or curve.

In one exemplary embodiment of the present invention, the resultant acceleration due to the increased accelerator pedal value is built up by utilizing an acceleration profile.

In an alternative example of a situation, other vehicle 108 first travels on the same lane ahead of vehicle 100 and is correctly classified by driver assistance system 102 as target vehicle 112. Target vehicle 112 makes a lane change onto the adjacent lane. The adjacent lane is, for example, a deceleration lane ahead of an exit. Driver assistance system 102 does not detect the lane change for some reason and continues to classify other vehicle 108 as target vehicle 112. When the driver accelerates during the automatically initiated braking operation, the distance controller aborts the braking operation, although other vehicle 108 continues to be erroneously classified as target vehicle 112.

Even though the driver reduces accelerator pedal value 122 at the onset of the braking operation, because target vehicle 112, for example, still partially occupies the lane, and first increases accelerator pedal value 122 when the lane is clear, the braking operation is aborted.

In one exemplary embodiment of the present invention, braking system 130 is activated with the aid of an emergency braking assistant of driver assistance system 102 for an emergency brake application when the driver assistance system detects an undershooting of a safety distance 132 when the braking operation has been aborted. Safety distance 132 is less than minimum distance 126. Safety distance 132 may be fallen below, for example, when other vehicle 108 does not leave detection range 106 during the aborted braking operation, i.e., the host lane is not clear after all.

Figure 2:
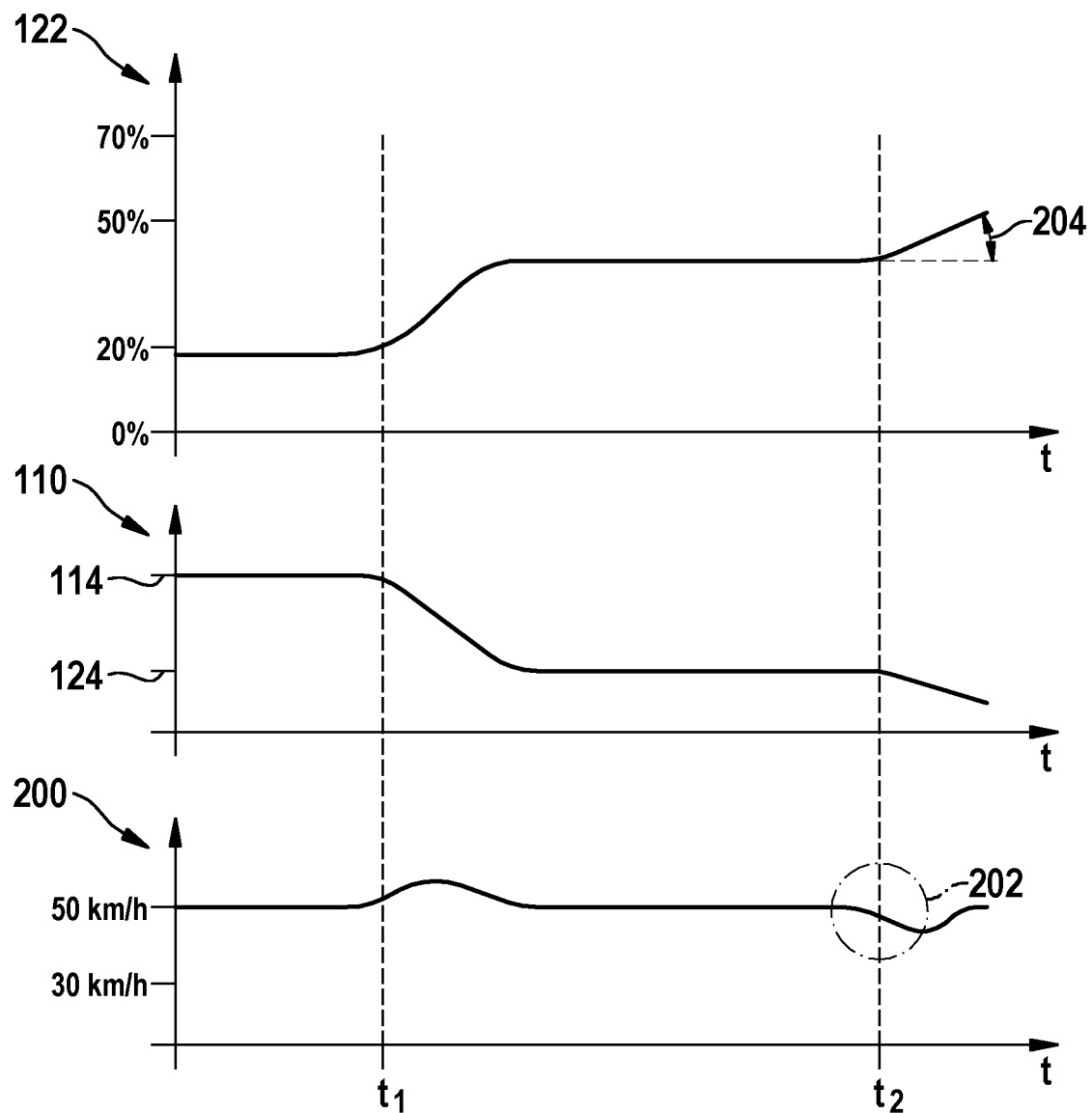
FIG. 2 shows a representation of various vehicle parameters during the execution of a method according to an exemplary embodiment of the present invention.

FIG. 2 shows a representation of various vehicle parameters during the execution of a method according to one exemplary embodiment. The vehicle parameters have been plotted as curves over time, for example, during an adjacent lane interference of the type shown in FIG. 1. The vehicle parameters in this case are a vehicle speed 200, a distance 110, and an accelerator pedal value 122. The curves of the vehicle parameters are represented one above the other in temporal correlation.

At the beginning of the curves, the accelerator pedal has been depressed by about 20 percent and the vehicle is traveling at 50 kilometers per hour. At a point in time t1, a target vehicle is detected and the distance controller engages with the drive controller of the vehicle, in order to position the vehicle at a setpoint distance 114 from the target vehicle. The driver wants a smaller distance 110 to the target vehicle, however, and depresses the accelerator pedal by approximately 40 percent. As a result, the vehicle briefly accelerates and is adjusted by the distance controller to a reduced setpoint distance 124.

The target vehicle moves over, for example, to the right and brakes. It is still identified as a relevant target vehicle, although it clears the lane for the vehicle. Since the target vehicle brakes, distance 110 decreases so quickly that the driver assistance system initiates a braking operation 202 at point in time t2. Due to braking operation 202, vehicle speed 200 decreases. The driver responds shortly after the onset of braking operation 202, in that he/she increases accelerator pedal value 122 in a controlled manner, in order to override the braking operation.

The driver assistance system recognizes the contradiction between automatic braking operation 202 and increasing accelerator pedal value 122 and aborts braking operation 202. After the abort, vehicle speed 200 increases again.

In one exemplary embodiment of the present invention, braking operation 202 is aborted when accelerator pedal value 122 has been increased by a predetermined amount 204 as compared to before braking operation 202.

In one exemplary embodiment of the present invention, vehicle speed 200 is raised after the abort to a value prior to braking operation 202, regardless of accelerator pedal value 122.

In other words, an accelerator pedal-based retraction of a deceleration request/braking request for driver input-limiting driver assistance functions takes place in FIGS. 1 and 2.

Driver assistance systems may offer the driver increased comfort and more safety (such as adaptive cruise control (ACC) and highway assist (HWA)). In addition, further assistance systems provide additional safety with the aid of distance warnings and emergency braking interventions. In the approach presented here, a driver-oriented assistance function, "dynamic distance assist" (DDA), is improved, which is to primarily largely relieve the driver of decelerating with the aid of the pedal, while leaving the accelerator pedal up to him/her.

In the case of adjacent lane interferences associated with adaptive cruise control (ACC), an object is erroneously detected as a target object, although it is located on one of the adjacent lanes. In these situations, the host vehicle may be undesirably decelerated. The driver has the opportunity, however, of easily compensating for this phenomenon, in that he/she takes over the control by actuating the accelerator pedal. In this case, the ACC function enters a passive state or an override state, since a detectable accelerator pedal actuation represents a higher demand than the deceleration desired by the function.

Adjacent lane interferences may also occur in the case of a driver-oriented function such as dynamic distance assist (DDA). These behave differently with respect to the driver as compared to adaptive cruise control (ACC), however. While the driver may very easily override the adjacent lane interferences in the case of adaptive cruise control (ACC), this is somewhat more difficult in the case of dynamic distance assist (DDA), since this function limits the driver input.

If the clearance by which a time gap may be reduced with the aid of the accelerator pedal has first been reduced to a minimum, previously a switch into the override state may take place only with the aid of a high accelerator pedal value or with the aid of a kickdown or an accelerator pedal gradient.

In accordance with an example embodiment of the present invention, the driver is also given the opportunity with respect to a driver input-limiting function such as dynamic distance assist (DDA), in particular in urban situations in the case of undesirable decelerations, such as in the case of adjacent lane interferences, of determining the driving behavior in a controlled manner with the aid of increased accelerator pedal values and of retracting a deceleration in a controlled manner.

The availability of the DDA function at high accelerator pedal values in the case of accelerations or consecutive trips at higher speeds is not significantly reduced. During expressway travel, the function remains active and provides protection also during travel at higher speeds. It first enters the override state at very high accelerator pedal values.

During city driving, an adjacent lane interference may result in unpleasantly long and intense decelerations. This is the case because, in the case of an undesirable deceleration, the natural response of the driver is not a very high accelerator pedal value or accelerator pedal gradient.

In the case of a deceleration, the accelerator pedal value may be stored and, depending on a positive delta with respect to this accelerator pedal value, then, in addition to the possibility of reducing the distance, the brake may also be released slowly and in a controllable manner and an undesirably intense speed reduction may be avoided.

If the first response of the driver to the undesirable or unexpected deceleration is a retraction of the accelerator pedal, the reference value may be lowered along therewith.

The driver may be alerted, for example, with the aid of a display device of the vehicle, to the fact that a release of the brake is carried out or a passive state is assumed more quickly in the case of decelerations at elevated accelerator pedal values.

Finally, it should be noted that terms such as "including," "encompassing," etc., do not exclude other elements or steps and terms such as "a" or "an" do not exclude a plurality.

What is claimed is:

1. A method for operating a distance controller of a vehicle, the method comprising the following steps:
   during an automatic control mode set by a driver of the vehicle in which the distance controller performs an automatic control of a speed of the vehicle to thereby regulate a distance of the vehicle to a target vehicle:
   activating, by the distance controller and in response to a detection of a shortening of the distance occurring while in the automatic control mode, an automatic braking operation; and
   in response to a manual actuation by the driver of a driver-actuatable operating element for increasing the speed during the braking operation, the distance controller:
   aborting the braking operation; and
   continuing to perform the automatic control of the speed of the vehicle without the braking operation.

2. The method as recited in claim 1, wherein the braking operation is aborted in response to satisfaction of a condition that the manual actuation includes a specified value of the driver-actuatable operating element being increased by a predefined speed-dependent amount.

3. The method as recited in claim 1, wherein the braking operation is aborted conditional upon that the manual actuation instructs the increasing of the speed to a value corresponding to that to which the vehicle was regulated immediately prior to the activation of the automatic braking.

4. The method as recited in claim 1, wherein a setpoint braking torque value is reduced during the abort of the braking operation by utilizing a reduction profile.

5. The method as recited in claim 1, further comprising:
   in response to the detection of the shortening of the distance, storing an accelerator pedal value that was present immediately prior to the braking operation as a reference value, wherein the manual actuation is responded to with the aborting of the braking operation conditional upon that the manual actuation specifies a value greater than the reference value.

6. The method as recited in claim 1, wherein the braking operation is aborted when the target vehicle is detected on an adjacent lane.

7. The method as recited in claim 1, wherein, in response to the detection of the shortening of the distance occurring while in the automatic control mode, a value of a setpoint power value for a drive train of the vehicle that was set before the activating of the braking operation is recorded, and the continuing to perform the automatic control is performed by increasing the setpoint power value back to the recorded value.

8. The method as recited in claim 1, wherein the driver-actuatable operating element is an accelerator pedal or a hand throttle lever or a speed twist grip.

9. A driver assistance system comprising a distance controller of a vehicle, wherein the distance controller is configured to:
- during an automatic control mode set by a driver of the vehicle in which the distance controller performs an automatic control of a speed of the vehicle to thereby regulate a distance of the vehicle to a target vehicle:
  - activate an automatic braking operation in response to a detection of a shortening of the distance occurring while in the automatic control mode; and
  - in response to a manual actuation by the driver of a driver-actuatable operating element for increasing the speed during the braking operation:
    - abort the braking operation; and
    - continue to perform the automatic control of the speed of the vehicle without the braking operation.

10. A non-transitory machine-readable memory medium on which is stored a computer program for operating a distance controller of a vehicle, the computer program, when executed by a computer of the distance controller, causing the computer to perform the following steps:
- during an automatic control mode set by a driver of the vehicle in which the distance controller performs an automatic control of a speed of the vehicle to thereby regulate a distance of the vehicle to a target vehicle:
  - activating, by the distance controller and in response to a detection of a shortening of the distance occurring while in the automatic control mode, an automatic braking operation; and
  - in response to a manual actuation by the driver of a driver-actuatable operating element for increasing the speed during the braking operation, the distance controller:
    - aborting the braking operation; and
    - continuing to perform the automatic control of the speed of the vehicle without the braking operation.

* * * * *